(12) United States Patent
Bahler et al.

(10) Patent No.: US 11,866,926 B2
(45) Date of Patent: Jan. 9, 2024

(54) TELESCOPING ADJUSTABLE DRAIN

(71) Applicant: Toolbro Innovators, LLC, Vernon, CT (US)

(72) Inventors: Philip J. Bahler, Vernon, CT (US); Kent R. Bahler, Vernon, CT (US)

(73) Assignee: TOOLBRO INNOVATORS, LLC, Vernon, CT (US)

( * ) Notice: Subject to any disclaimer, the term of this patent is extended or adjusted under 35 U.S.C. 154(b) by 272 days.

(21) Appl. No.: 17/466,592

(22) Filed: Sep. 3, 2021

(65) Prior Publication Data
US 2023/0071880 A1 Mar. 9, 2023

(51) Int. Cl.
*E03F 5/04* (2006.01)

(52) U.S. Cl.
CPC .... *E03F 5/0407* (2013.01); *E03F 2005/0413* (2013.01)

(58) Field of Classification Search
CPC . E03F 5/0407; E03F 2005/0413; Y02A 30/60
USPC .............................. 4/292, 286, 289–291, 650
See application file for complete search history.

(56) References Cited

U.S. PATENT DOCUMENTS

| | | | |
|---|---|---|---|
| 7,958,686 B1* | 6/2011 | Majocka | E03F 5/0407 52/302.1 |
| 2016/0010320 A1* | 1/2016 | Huber | E03F 5/0407 210/164 |
| 2019/0119896 A1* | 4/2019 | Priester | E03F 5/0407 |
| 2023/0102254 A1* | 3/2023 | Noonan | E03F 5/0407 52/747.11 |

* cited by examiner

*Primary Examiner* — Lori L Baker
(74) *Attorney, Agent, or Firm* — CANTOR COLBURN LLP

(57) ABSTRACT

An adjustable drain having catch basin defining: a pan with a pan seating portion along a pan perimeter surface; and a pan base that slopes downwardly and inwardly from the pan seating portion to a pan aperture for water flowthrough, an inner tube that is integral with the pan aperture having an inner tube peripheral wall that extends into an underside of the catch basin; and a pan lip extending upwardly from the pan perimeter surface to position the cover against the pan, the pan lip and inner tube are unitary with the pan to form a leakproof transition; an outer tube disposed below the pan base, the outer tube having an outer tube top end and an outer tube peripheral wall extending downwardly from the outer tube top end to an outer tube bottom end, wherein the inner and outer tubes are telescoping tubes.

20 Claims, 5 Drawing Sheets

TELESCOPING ADJUSTABLE DRAIN

BACKGROUND

The embodiments relate to a drainage system and more specifically to a telescoping adjustable drain. Drainage systems direct water to drainpipes in a ground. Issues may occur where water is allowed to drain through the structure rather than being directed to the drainpipes. In addition, issues may occur where the drain system is not flush with the surrounding ground level.

BRIEF SUMMARY

Disclosed is an adjustable drain, including: catch basin defining: a pan that has: a pan seating portion along a pan perimeter surface that is generally flat and configured to seat a cover; and a pan base that slopes downwardly and extends inwardly from the pan seating portion to a pan aperture that is defined by a pan aperture boundary for water flowthrough; an inner tube having an inner tube top end that is integral with the pan aperture boundary and an inner tube peripheral wall that extends downwardly from the inner tube top end to an inner tube bottom end, into an underside of the catch basin, and is sized to complement the pan aperture boundary; and a pan lip surrounding and extending upwardly from the pan perimeter surface and is configured to position the cover against the pan when the cover is seated on the pan seating portion, wherein the pan lip and inner tube are unitary with the pan to form a leakproof transition therebetween; and an outer tube disposed below the pan base, the outer tube having an outer tube top end and an outer tube peripheral wall extending downwardly from the outer tube top end to an outer tube bottom end, wherein the inner and outer tubes are configured as telescoping tubes and the outer tube is disposed exterior to the inner tube.

In addition to the above disclosed aspects, or as an alternate, the inner tube includes an inner tube crossmember that extends radially within the inner tube and, end to end, is formed integrally with the inner tube peripheral wall, the inner tube crossmember being located intermediate of the inner tube top and bottom ends and having an upper threaded opening at a radial center thereof; the outer tube includes an outer tube crossmember that has a center member that extends radially at the outer tube bottom end and, end to end, is connect with the outer tube peripheral wall via first and second flanges, the outer tube crossmember having a lower threaded opening at a radial center thereof; and an adjustment rod extends between the upper and lower threaded openings, wherein in operation, the adjustment rod is rotated to raise or lower the catch basin, including the inner tube, relative to the outer tube, and wherein a length of the inner and outer tubes is such that the inner and outer tubes are configured to axially overlap at a maximum telescopic extension of the inner and outer tubes.

In addition to the above disclosed aspects, or as an alternate, the outer tube and inner tube are cylindrical tubes.

In addition to the above disclosed aspects, or as an alternate, the outer tube crossmember is a plate having a web defined by the center member; the first and second flanges are shaped to compliment the outer tube bottom end and extend circumferentially outward from the center member such that the center member is located at respective circumferential centers of the flanges; the outer tube defines first and second grooves that are located and sized to respectively receive the first and second flanges; and first and second radial outer surfaces of the first and second flanges are flush with the outer tube peripheral wall, and a bottom surface of the outer tube crossmember is flush with the outer tube bottom end.

In addition to the above disclosed aspects, or as an alternate, the first and second flanges are glued to the first and second grooves.

In addition to the above disclosed aspects, or as an alternate, spacer ribs are formed on the inner tube peripheral wall to face the outer tube peripheral wall and extend along the inner tube peripheral wall, from the inner tube top end to the inner tube bottom end, and are configured to reduce contact resistance between the inner and outer tubes.

In addition to the above disclosed aspects, or as an alternate, the pan lip extends downwardly to form a pan skirt that surrounds the underside of the catch basin, and which is configured for positioning the catch basin against a ground structure.

In addition to the above disclosed aspects, or as an alternate, reinforcement ribs are disposed on the underside of the catch basin and extend between the pan and the pan skirt, and the reinforcement ribs are arranged in a star configuration.

In addition to the above disclosed aspects, or as an alternate, each of the reinforcement ribs is generally triangular, with a first edge disposed along the pan and a second edge disposed along the pan skirt.

In addition to the above disclosed aspects, or as an alternate, a third edge of the reinforcement ribs defines a scooped-arcuate shape.

In addition to the above disclosed aspects, or as an alternate, a pan perimeter, defined by a pan perimeter boundary that surrounds the pan lip, is square, and the pan aperture is circular and located at a center of the pan.

In addition to the above disclosed aspects, or as an alternate, the pan base is defined by pan base sections that are generally planar, each extending between adjacent corners of the pan, wherein adjacent ones of the pan base sections are connected by one of a plurality of pan grooves formed in the pan base, and wherein each of the plurality of pan grooves extends inwardly from the pan seating portion to the pan aperture.

In addition to the above disclosed aspects, or as an alternate, the cover has grate openings and has a cover perimeter, defined by a cover perimeter boundary, that is shaped to be received within the pan lip, so that the cover is square configured to seat against the pan seating portion.

In addition to the above disclosed aspects, or as an alternate, the cover defines a cover seating portion that extends inwardly from the cover perimeter boundary to a cover grate portion that has the grate openings; and the cover seating portion is without grate openings and is shaped to complement the pan seating portion so that the cover seating portion is against the pan seating portion when the cover is against the pan.

In addition to the above disclosed aspects, or as an alternate, a bottom side of the cover grate portion defines support ribs that extend downwardly, away from the cover grate portion.

In addition to the above disclosed aspects, or as an alternate, the support ribs extend linearly, end to end, and are arranged in a star configuration to align with the reinforcement ribs when the cover is installed against the catch basin, wherein the support ribs are oriented to cross each other at a center of the cover.

In addition to the above disclosed aspects, or as an alternate, opposite ends of the support ribs are shaped to tapper toward the cover seating portion, whereby the cover is configured to fit flush against the pan.

In addition to the above disclosed aspects, or as an alternate, the catch basin is formed of plastic and the cover is formed of plastic or metal.

Disclosed is a method of installing an adjustable drain having one or more of the above disclosed aspects, the method including connecting the outer tube of the adjustable drain to a drainpipe installed in the ground structure; and rotating the adjustment rod while the catch basin is rotatably stationary relative to the ground structure, to move the catch basin upwardly or downwardly, depending on a rotational direction of the adjustment rod, until the pan lip is flush with the ground structure or otherwise at a predetermined level.

In addition to the above disclosed aspects, or as an alternate, the method includes seating the cover against the pan.

BRIEF DESCRIPTION OF THE DRAWINGS

The present disclosure is illustrated by way of example and not limited in the accompanying figures in which like reference numerals indicate similar elements.

DETAILED DESCRIPTION

Aspects of the disclosed embodiments will now be addressed with reference to the figures. Aspects in any one figure is equally applicable to any other figure unless otherwise indicated. Aspects illustrated in the figures are for purposes of supporting the disclosure and are not in any way intended on limiting the scope of the disclosed embodiments. Any sequence of numbering in the figures is for reference purposes only.

Figure 1:
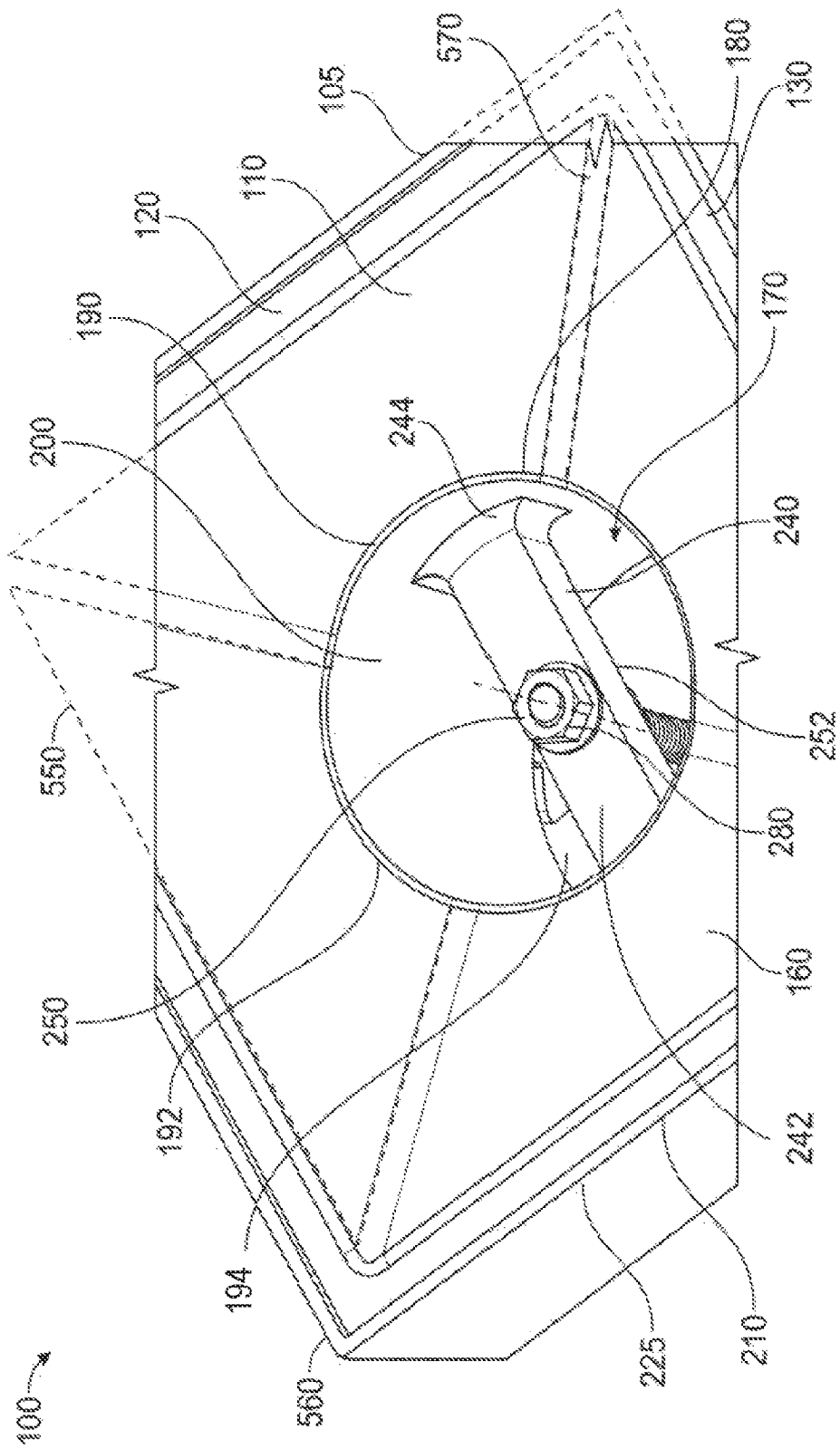
FIG. 1 is a top perspective view of an adjustable drain according to an embodiment.
Figure 5:
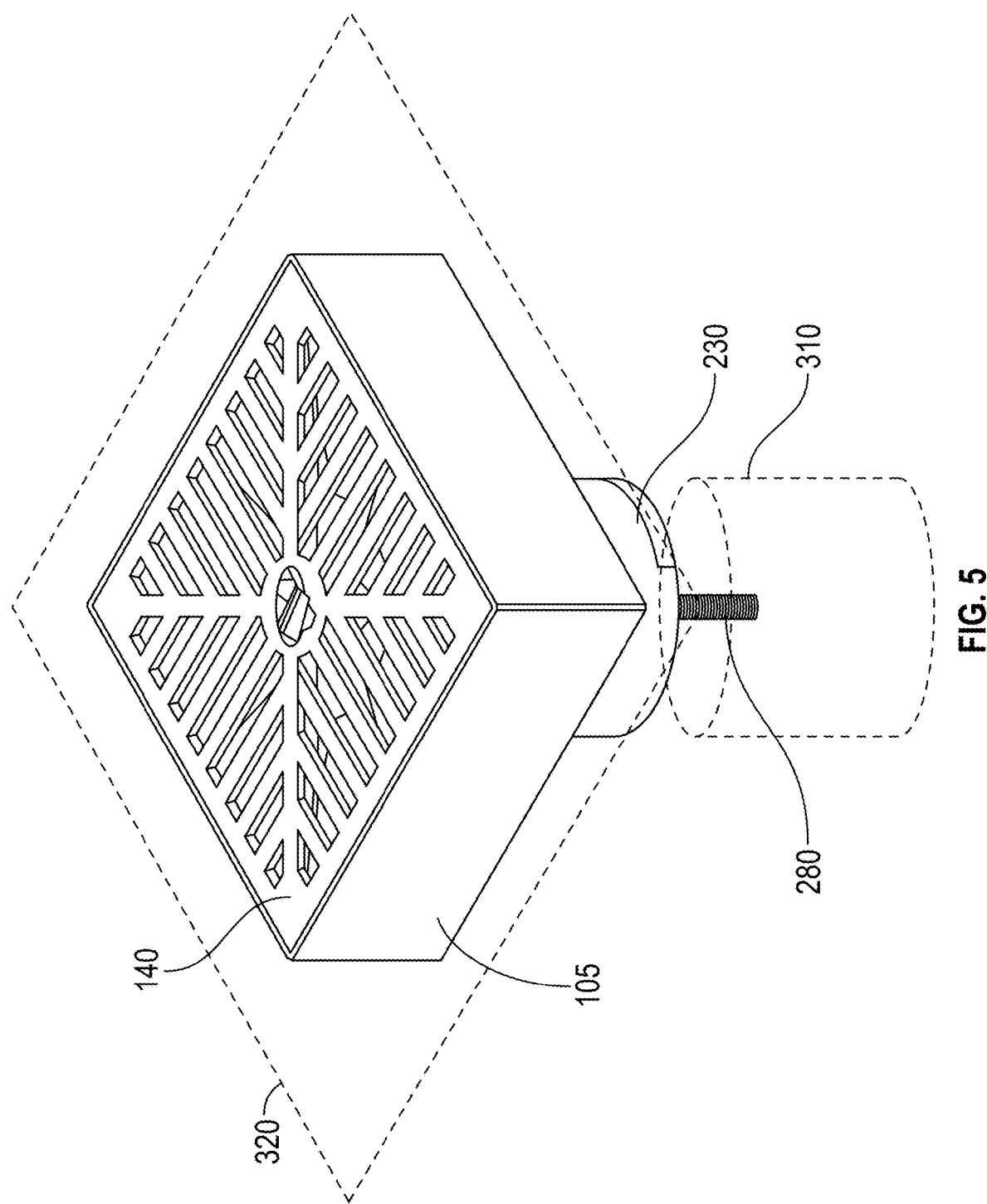
FIG. 5 is a top perspective view of the adjustable drain with the cover installed thereon, and wherein the drain is connected to a drainpipe and flush with a ground.

Turning to FIG. 1, an adjustable drain (or drain) 100 is shown. The drain 100 includes a catch basin 105 that has a pan 110. The pan 110 has a pan seating portion 120 along an pan perimeter surface 130 that is generally flat and configured to seat a cover 140 (FIG. 5). A pan base 160 slopes downwardly and extends inwardly from the pan seating portion 120 to a pan aperture 170, defined by a pan aperture boundary 180, for water flowthrough.

An inner tube 190 of the catch basin 105 has an inner tube top end 192 integrally formed with the pan aperture boundary 180 and an inner tube peripheral wall 200 extending downwardly (along an axial direction, A) from the inner tube top end 192 to an inner tube bottom end 194, into an underside 202 (FIG. 2) of the catch basin 105. The inner tube peripheral wall 200 is sized, at the inner tube top end 192, to complement (e.g., to match) the pan aperture boundary 180. A pan perimeter lip (or pan lip) 210 surrounds and extends upwardly from the pan perimeter surface 130 and is configured to position the cover 140 against the pan 110 when the cover 140 is seated on the pan seating portion 120 (FIG. 5). The pan lip 210 and inner tube 190 are unitary with the pan 110 to form a leakproof transition therebetween. In one embodiment, a pan perimeter defined by a pan perimeter boundary 225 is square, and the pan aperture boundary 180 is circular and located at a pan base center of the pan 110.

Figure 2:
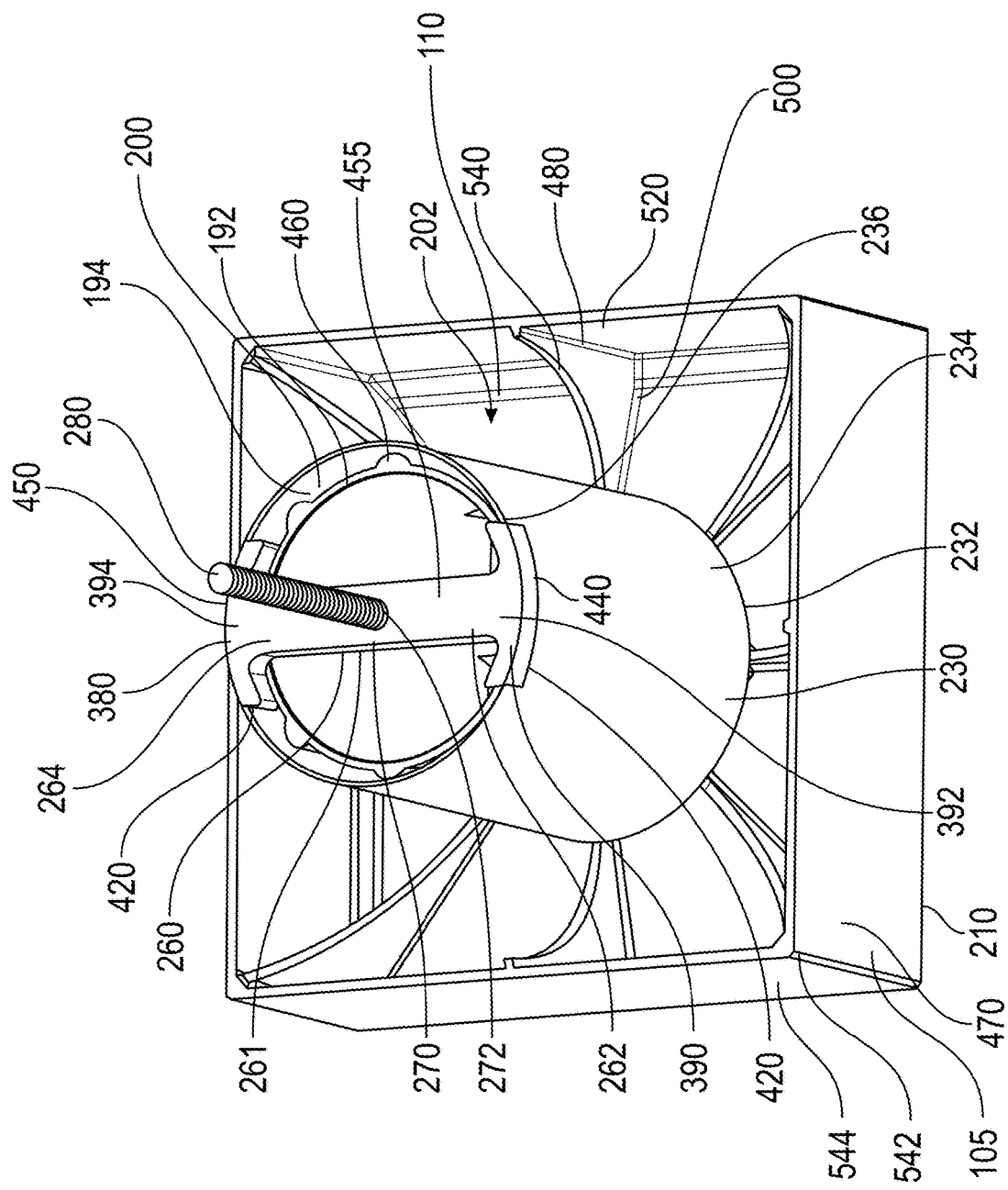
FIG. 2 is a bottom perspective view of the adjustable drain.
Figure 2:
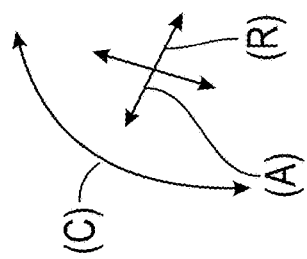

Turning to FIG. 2, an outer tube 230 is disposed below the pan base 160 and has an outer tube top end 232 and an outer tube peripheral wall 234 that extends downwardly from the outer tube top end 232 to an outer tube bottom end 236. The inner and outer tubes 190, 230 are configured as telescoping tubes, and the outer tube 230 is disposed exterior to the inner tube 190.

Turning back to FIG. 1, the inner tube 190 includes an inner tube crossmember 240 that extends radially (along a radial direction, R) within the inner tube 190 and, end to end 242, 244, is formed integrally with the inner tube peripheral wall 200. The inner tube crossmember 240 is located intermediate of the inner tube top and bottom ends 192, 194 and has an upper threaded opening 250 (the threads may be provided internally or via hex nut attached to the crossmember) at a radial center 252 thereof. Turning back to FIG. 2, the outer tube 230 includes an outer tube crossmember 260 with a center member 261 that extends radially at the outer tube bottom end 236 and, end to end 262, 264, connects with the outer tube peripheral wall 234 via first and second flanges 380, 390. The outer tube crossmember 260 has a lower threaded opening 270 (the threads are provided similarly as above) at a radial center 272 thereof. An adjustment rod 280 (also in FIG. 1) extends between the upper and lower threaded openings 250, 270.

Rotating the adjustment rod 280 raises and lowers the catch basin 105, including the inner tube 190, relative to the outer tube 230. This may occur without rotation of the catch basin 105 relative to the outer tube 230. In operation, when the outer tube 230 is fixed to a drainpipe 310 located in a ground structure 320, rotating the adjustment rod 280 raises and lowers the catch basin 105 relative to the ground structure 320. Thus, movement of the catch basin 105 occurs without rotation of the catch basin 105 relative to the ground structure 320. A length of the inner and outer tubes 190, 230 is such that the inner and outer tubes 190, 230 axially overlap at a maximum telescopic extension of the inner and outer tubes 190, 230.

Remaining with FIG. 2, in one embodiment, the outer tube 230 and inner tube 190 are cylindrical tubes. In an embodiment, the outer tube crossmember 260 may be a plate and the center member 261 defines a web of the plate 330. The first and second flanges 380, 390 are shaped to complement the outer tube bottom end 236 and thus are semi-circular in shape. The flanges 380, 390 respectively extend outwardly from the center member 261 such that the center member 261 is located at respective circumferential centers 392, 394 (relative to a circumferential direction C, FIG. 1) of the flanges 380, 390. The outer tube 230 has first and second grooves 420, 430 that are located and sized to respectively receive the first and second flanges 380, 390. The structure is configured so that respective first and second radial outer surfaces 440, 450 of the first and second flanges 380, 390 are flush with the of the outer tube peripheral wall 234. In addition, a bottom surface 455 the outer tube crossmember 260 is flush with the outer tube bottom end 236.

The outer tube crossmember 260 may be formed of metal, such as steel or other metal that is treated to be, or is naturally, rust-resistant. In one embodiment, the first and second flanges 380, 390 are glued to the first and second grooves 420, 430. In an embodiment, the outer tube 230 is formed from PVC (polyvinyl chloride) and fixed to the drainpipe 310 via a PVC adhesive, such as pipe cement.

Spacer ribs, generally referenced as 460, are formed on the inner tube peripheral wall 200 to face the outer tube peripheral wall 234, and extend along the inner tube peripheral wall 200, from the inner tube top end 192 (FIG. 1) to the inner tube bottom end 194. The spacer ribs 460 are utilized for reducing a contact resistance between the inner and outer tubes 190, 230.

A pan skirt 470 extends downwardly from the pan lip 210 to form an outer shell of the catch basin 105 and surrounds the underside 202 of the catch basin 105. A height of the pan skirt 470 may be approximately half a height of the inner tube 190, though a longer or shorter skirt is within the scope of the disclosure, e.g., 25% to 150% of the length of the inner tube 193. The pan skirt 470 is configured for positioning the catch basin 105 against a ground structure 320.

Reinforcement ribs 480 are disposed on the underside 202 of the catch basin 105 and extend between the pan 110 and the pan skirt 470. Each of the reinforcement ribs 480 is generally triangular, with a first edge 500 disposed along the pan 110 and a second edge 520 disposed along the pan skirt 470. As shown in FIG. 2, a third edge 540 of the reinforcement ribs 480 defines a scooped-arcuate shape. The reinforcement ribs 480 may be arranged in a star configuration. For example, respective ones of the reinforcement ribs 480 may extend between opposite skirt corners, generally referenced a 542, and bisect opposite skirt sidewalls, generally referenced as 544.

Turning back to FIG. 1, the pan base 160 is defined by pan base sections, generally referenced as 550 with one of the pan base sections 550 outlined in dashed lines for clarity. Accordingly there are four such pan base sections 550, which are generally planar. As used herein, the term section is not intended to require that the sections be structurally separable from each other but instead may be portions of a unitary structure. Each of the pan base sections 550 extends between adjacent pan corners, generally reference as 560. Adjacent ones of the pan base sections 550 are connected by one of a plurality of pan grooves, generally referenced as 570 with one of the pan grooves 570 outlined in dashed lines for clarity, formed in the pan base 160. Each of the plurality of pan grooves 570 extends inwardly from the pan seating portion 120 to the pan aperture 170. The sections and grooves help guide wastewater to the pan aperture 170.

Figure 3:
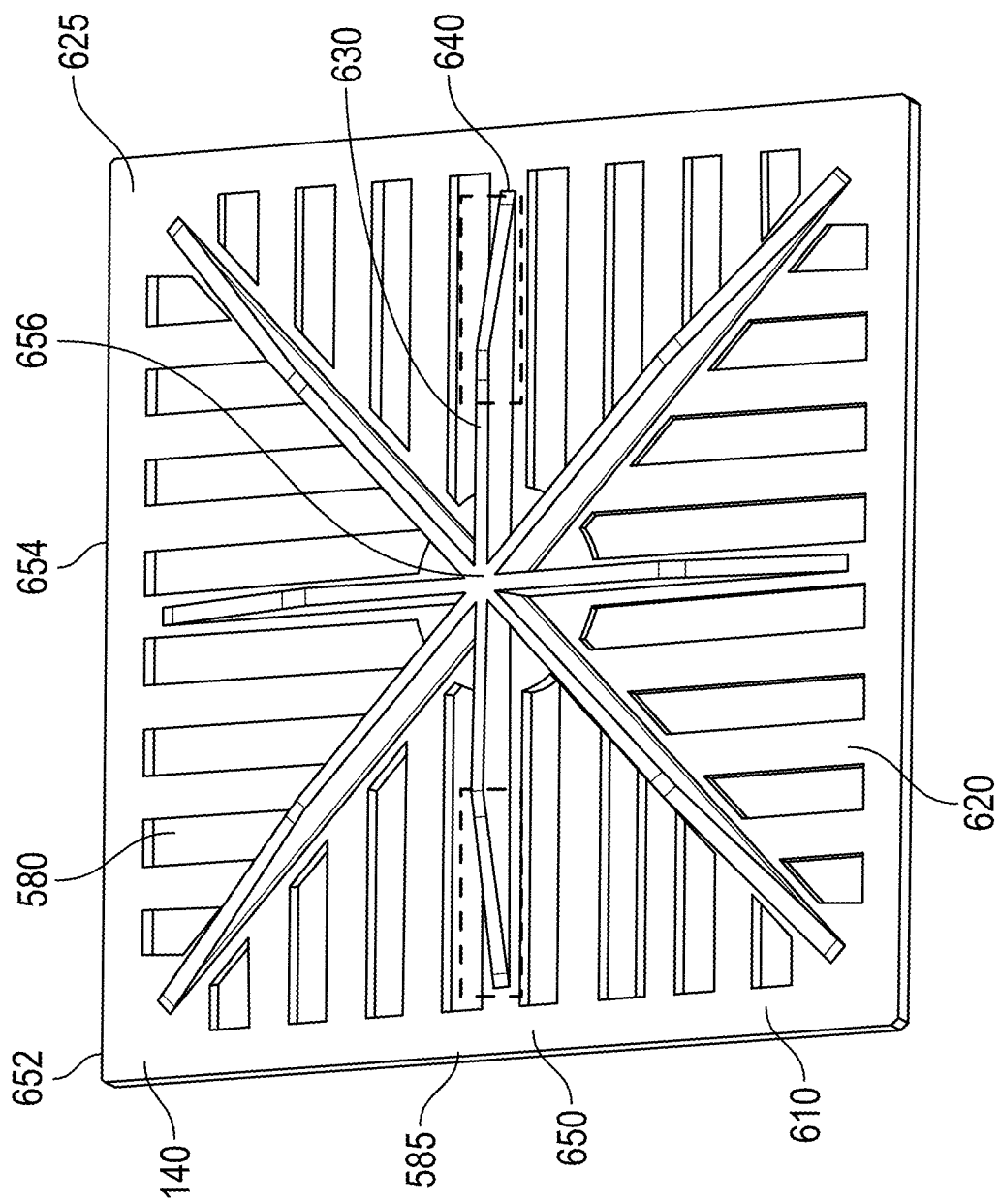
FIG. 3 is a bottom perspective view of a cover for the adjustable drain, according to an embodiment.

As shown in FIG. 3, the cover 140 is provided that has grate openings 580 and has a cover perimeter defined by a cover perimeter boundary 585, that is shaped to be received within the pan lip 210. With this configuration, the cover 140 is square. The cover 140 defines a cover seating portion 610 that extends inwardly from the cover perimeter boundary 585 to a cover grate portion 620 which has the grate openings 580. The cover seating portion 610 is without grate openings and is shaped complement the pan seating portion 120 (FIG. 1). With this configuration, the cover seating portion 610 disposed is against the pan seating portion 120 when the cover 140 is against the pan 110.

In one embodiment, a bottom side 625 of the cover grate portion 620 defines a plurality of support ribs, generally referenced as 630, that extend downwardly, away from the cover grate portion 620. The support ribs 630 may be utilized when the cover 140 is fabricated from plastic and may not be required if the cover 140 is fabricated from a rigid material such as metal. The support ribs 630 extend linearly end to end 640, 650. The support ribs 630 may be arranged in a star configuration to complement, and overlap with, the configuration of the reinforcement ribs 480. For example, respective ones of the support ribs 630 may extend between opposite cover corners, generally referenced as 652, and bisect opposite cover side edges, generally referenced as 654. In one embodiment, as shown, there are three elongate support ribs that cross each other at a center 656 of the cover 140. The ends 640, 650 of the support ribs 630 may tapper toward the cover seating portion 610. With this configuration, the cover 140 is configured to fit flush against the pan 110 with the support ribs 630 engaging the pan 110 for support against deformation of the cover 140 from weight due to, e.g., foot traffic.

Figure 4:
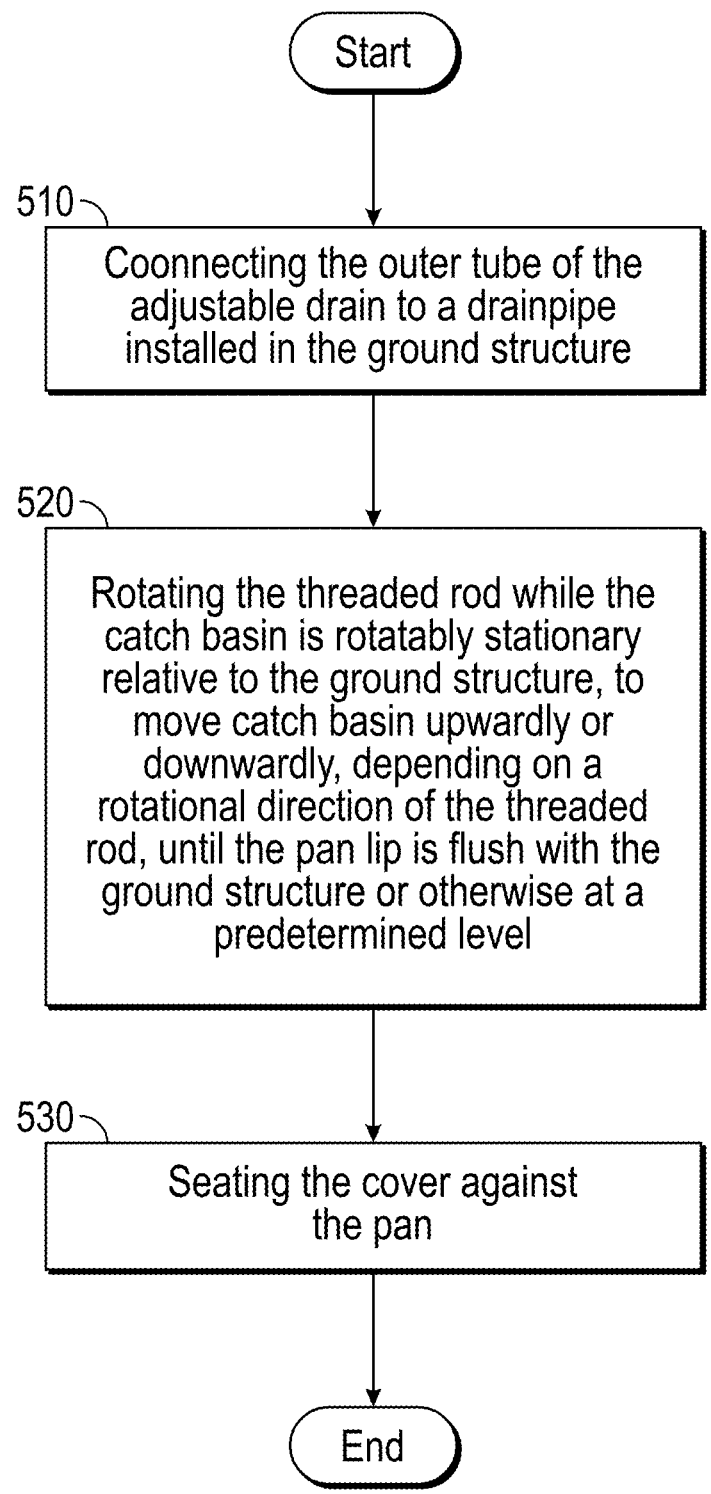
FIG. 4 is a flowchart showing a method of installing an adjustable drain.

Turning to FIGS. 4 and 5, flowchart and schematic figure show a method of installing the drain 100. As shown in block 510, the method includes connecting the outer tube 230 of the drain 100 to the drainpipe 310 installed in the ground structure 320. As shown in block 520, the method further includes rotating the adjustment rod 280, while the catch basin 105 is rotatably stationary relative to the ground structure 320, to move catch basin 105 upwardly or downwardly, depending on a rotational direction of the adjustment rod 280. The rotation continues until the pan lip 210 of the catch basin 105 is flush with the ground structure 320 or otherwise at a predetermined level. As shown in block 530, the method includes seating the cover 140 against the pan 110.

The embodiment shown in FIG. 5 is a preassembled configuration of the drain. Embodiments that require on-site assembly are within the scope of the disclosure. For example, the outer tube, inner tube and adjustment rod may be assembled on-site, before or after the outer tube is cemented to the drainpipe. In such configuration, the outer tube crossmember would be installed beforehand or could be connected to the outer tube on-site with an adhesive or other implement.

The above drain is configured for being installed in a ground by rotating an adjustment rod (e.g., with a hex wrench, or hex fitting attached to a drill, engaging an exposed hex nut at the top of the rod, which spins against a top of the inner tube cross member) and without having to rotate the catch basin. The catch basin is formed of plastic so that it is configured to provide a continuous leakproof flow path for wastewater, from the pan lip to the inner tube.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An adjustable drain, comprising:
catch basin defining:
- a pan that has:
  - a pan seating portion along a pan perimeter surface that is generally flat and configured to seat a cover; and
  - a pan base that slopes downwardly and extends inwardly from the pan seating portion to a pan aperture that is defined by a pan aperture boundary for water flowthrough,
- an inner tube having an inner tube top end that is integral with the pan aperture boundary and an inner tube peripheral wall that extends downwardly from the inner tube top end to an inner tube bottom end, into an underside of the catch basin, and is sized to complement the pan aperture boundary; and
- a pan lip surrounding and extending upwardly from the pan perimeter surface and is configured to position the cover against the pan when the cover is seated on the pan seating portion,
- wherein the pan lip and inner tube are unitary with the pan to form a leakproof transition therebetween; and
an outer tube disposed below the pan base, the outer tube having an outer tube top end and an outer tube peripheral wall extending downwardly from the outer tube top end to an outer tube bottom end,
wherein the inner and outer tubes are configured as telescoping tubes and the outer tube is disposed exterior to the inner tube.

2. The drain of claim 1, wherein:
the inner tube includes an inner tube crossmember that extends radially within the inner tube and, end to end, is formed integrally with the inner tube peripheral wall, the inner tube crossmember being located intermediate of the inner tube top and bottom ends and having an upper threaded opening at a radial center thereof;
the outer tube includes an outer tube crossmember that has a center member that extends radially at the outer tube bottom end and, end to end, is connect with the outer tube peripheral wall via first and second flanges, the outer tube crossmember having a lower threaded opening at a radial center thereof; and
an adjustment rod extends between the upper and lower threaded openings,
wherein in operation, the adjustment rod is rotated to raise or lower the catch basin, including the inner tube, relative to the outer tube, and
wherein a length of the inner and outer tubes is such that the inner and outer tubes are configured to axially overlap at a maximum telescopic extension of the inner and outer tubes.

3. The drain of claim 2, wherein:
the outer tube and inner tube are cylindrical tubes.

4. The drain of claim 3, wherein:
the outer tube crossmember is a plate having a web defined by the center member;
the first and second flanges are shaped to compliment the outer tube bottom end and extend circumferentially outward from the center member such that the center member is located at respective circumferential centers of the flanges;
the outer tube defines first and second grooves that are located and sized to respectively receive the first and second flanges; and
first and second radial outer surfaces of the first and second flanges are flush with the outer tube peripheral wall, and a bottom surface of the outer tube crossmember is flush with the outer tube bottom end.

5. The drain of claim 4, wherein:
the first and second flanges are glued to the first and second grooves.

6. The drain of claim 5, wherein:
spacer ribs are formed on the inner tube peripheral wall to face the outer tube peripheral wall and extend along the inner tube peripheral wall, from the inner tube top end to the inner tube bottom end, and are configured to reduce contact resistance between the inner and outer tubes.

7. The drain of claim 6, wherein:
the pan lip extends downwardly to form a pan skirt that surrounds the underside of the catch basin, and which is configured for positioning the catch basin against a ground structure.

8. The drain of claim 7, wherein:
reinforcement ribs are disposed on the underside of the catch basin and extend between the pan and the pan skirt, and the reinforcement ribs are arranged in a star configuration.

9. The drain of claim 8, wherein:
each of the reinforcement ribs is generally triangular, with a first edge disposed along the pan and a second edge disposed along the pan skirt.

10. The drain of claim 9, wherein:
a third edge of the reinforcement ribs defines a scooped-arcuate shape.

11. The drain of claim 10, wherein:
a pan perimeter, defined by a pan perimeter boundary that surrounds the pan lip, is square, and the pan aperture is circular and located at a center of the pan.

12. The drain of claim 11, wherein:
the pan base is defined by pan base sections that are generally planar, each extending between adjacent corners of the pan, wherein adjacent ones of the pan base sections are connected by one of a plurality of pan grooves formed in the pan base, and wherein each of the plurality of pan grooves extends inwardly from the pan seating portion to the pan aperture.

13. The drain of claim 12, wherein:
the cover has grate openings and has a cover perimeter, defined by a cover perimeter boundary, that is shaped to be received within the pan lip, so that the cover is square configured to seat against the pan seating portion.

14. The drain of claim 13, wherein:
the cover defines a cover seating portion that extends inwardly from the cover perimeter boundary to a cover grate portion that has the grate openings; and
the cover seating portion is without grate openings and is shaped to complement the pan seating portion so that the cover seating portion is against the pan seating portion when the cover is against the pan.

15. The drain of claim 14, wherein:
a bottom side of the cover grate portion defines support ribs that extend downwardly, away from the cover grate portion.

16. The drain of claim 15, wherein:
the support ribs extend linearly, end to end, and are arranged in a star configuration to align with the reinforcement ribs when the cover is installed against the catch basin, wherein the support ribs are oriented to cross each other at a center of the cover.

17. The drain of claim 16, wherein:
opposite ends of the support ribs are shaped to tapper toward the cover seating portion, whereby the cover is configured to fit flush against the pan.

18. The drain of claim 1, wherein:
the catch basin is formed of plastic and the cover is formed of plastic or metal.

19. A method of installing the adjustable drain of claim 7, comprising:
connecting the outer tube of the adjustable drain to a drainpipe installed in the ground structure; and
rotating the adjustment rod while the catch basin is rotatably stationary relative to the ground structure, to move the catch basin upwardly or downwardly, depending on a rotational direction of the adjustment rod, until the pan lip is flush with the ground structure or otherwise at a predetermined level.

20. The method of claim 19, including seating the cover against the pan.

* * * * *